J. H. HALL.
SPARE WHEEL HOLDING DEVICE.
APPLICATION FILED JULY 20, 1909.
981,555.
Patented Jan. 10, 1911.
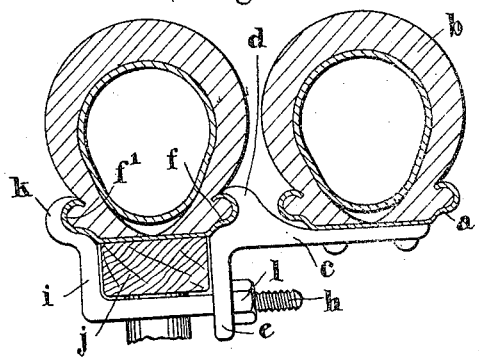
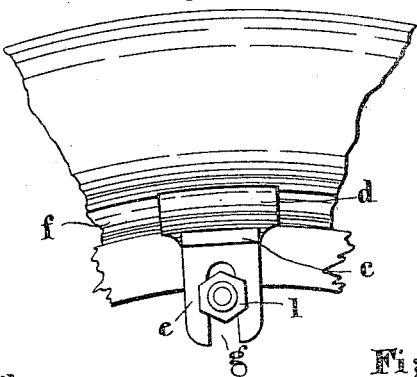
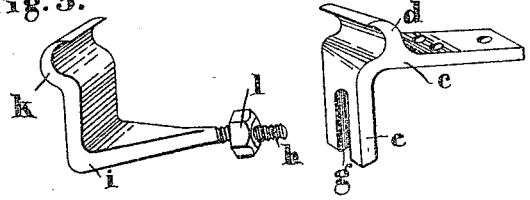
Witnesses
M. Gray
W. A. Williams
Inventor
John H. Hall
by [signature]
his atty

UNITED STATES PATENT OFFICE.

JOHN H. HALL, OF SHEFFIELD, ENGLAND.

SPARE-WHEEL-HOLDING DEVICE.

981,555.

Specification of Letters Patent. Patented Jan. 10, 1911.

Application filed July 20, 1909. Serial No. 508,565.

*To all whom it may concern:*

Be it known that I, JOHN HENRY HALL, a subject of the King of Great Britain and Ireland, and residing at 51 Crescent road, city of Sheffield, England, have invented certain new and useful Spare-Wheel-Holding Devices, of which the following is a specification.

This invention relates to means for removably securing or attaching to the ordinary road wheel of a motor or other road vehicle, a spare rim carrying a tire, for the purpose of taking the load when the tire upon the ordinary wheel has become punctured or damaged in any way.

An object of the invention is to provide means for quickly and firmly securing a spare rim in position for the purpose above mentioned and also to prevent skidding.

Another object of the invention is to so position the spare rim in relation to the wheel rim that an ample space is provided between the two tires so that no friction or chafing can occur between them.

A further object is to form such means as above referred to so that the spare rim is secured to the metallic rim of the wheel and further, secured in such a manner as to prevent any creeping action taking place between the two rims.

In the accompanying drawings:—Figure 1 is a part sectional elevation showing the invention as applied to an ordinary road wheel. Fig. 2 is an elevation showing a clamp and bracket attached, the spare rim and tire are not shown. Figs. 3 and 4 are perspective views of the clamping device and bracket respectively.

In carrying out the invention a spare rim $a$ carrying a tire $b$ is fitted with brackets $c$, preferably four in number, which may be riveted or otherwise secured to the inner periphery of the rim in such a position that when the spare rim is secured to the wheel there is ample space left between the same either when the spare rim is attached because the ordinary tire is punctured or when it is attached to prevent skidding, when both tires are fully inflated. The bracket $c$ is formed with a gripping portion $d$ and a depending portion $e$, the former being adapted to engage the beading $f$ of the ordinary wheel rim and the latter being provided with a hole or slot $g$ to receive the screwed bolt or pin $h$ of a clamping device $i$. The clamp $i$, is formed to pass around the felly $j$ of the wheel, a small clearance being provided between the two, and is provided with a gripping portion $k$, similar to that upon the bracket $c$ to engage the beading $f'$ of the wheel rim. A nut or the like $l$ is provided upon the screwed pin $h$ so that the spare rim may be rigidly clamped to the ordinary road wheel. The gripping portions $k$ and $d$ are formed so that when fitted to the beadings they do not in any respect interfere with the tire upon the wheel when fully inflated or otherwise, and as clearance is left between the felly $j$ and the clamping device $i$, and the depending portion $e$ of the bracket, the gripping action takes place wholly upon the metallic rim.

It will be seen from the foregoing description and the drawings that the gripping action upon the rim of the wheel will be in a horizontal direction, or across the rim. In the event of any relative circumferential movement occurring between the two rims the clamps will tend to take up an oblique position so that the edges of the same will bind to the rim very tightly and thus any tendency the spare rim may develop to creep with relation to the wheel rim will be prevented.

In order to attach the spare rim carrying the inflated tire to the ordinary road wheel, either in the case of the usual tire becoming punctured or otherwise damaged or to prevent skidding when it is preferable that the spare tire should be studded or otherwise provided with a non-skid tread, the depending portions $e$ of the brackets are placed close to felly $j$ and at the same time the gripping pieces $d$ are fitted to the beading $f$. The clamps $i$ are put into position with the gripping portions $k$ engaging the beading $f'$ and then placed in the slots $g$ and the nuts $l$ are tightened up, rigidly securing the spare rim in position.

The spare rim is detached by slackening the nuts $l$ and removing the clamps $i$ when it may be lifted away and placed in any convenient position on the car.

The invention may be applied to wire wheels without any modification, the gripping action taking place wholly upon the metallic rim as hereinbefore described.

Having now described my invention what I claim as new and desire to secure by Letters Patent is:—

A wheel clamping device of the character described being independent of the spokes and felly comprising an angular member $c$ formed with a slot in one arm, a rim engaging lip as at $d$ adjacent to the horizontal arm of the angular member $c$, a second angular member $i$ formed on one end with a lip engaging portion $k$ and at its opposite end with screw threads as at $h$ and a nut engaging the threaded end to clamp the two members together, the horizontal arm of the member $c$ being such as to form a space between the main and auxiliary tires when the device is in use substantially as and for the purposes described.

In testimony whereof I affix my signature in the presence of two witnesses.

JNO. H. HALL.

Witnesses:
BERTRAM H. MATTHEWS,
J. PHILLIPS CRAWLEY.